R. A. NORLING.
ROLLER BEARING.
APPLICATION FILED NOV. 30, 1910.
1,074,643.
Patented Oct. 7, 1913.
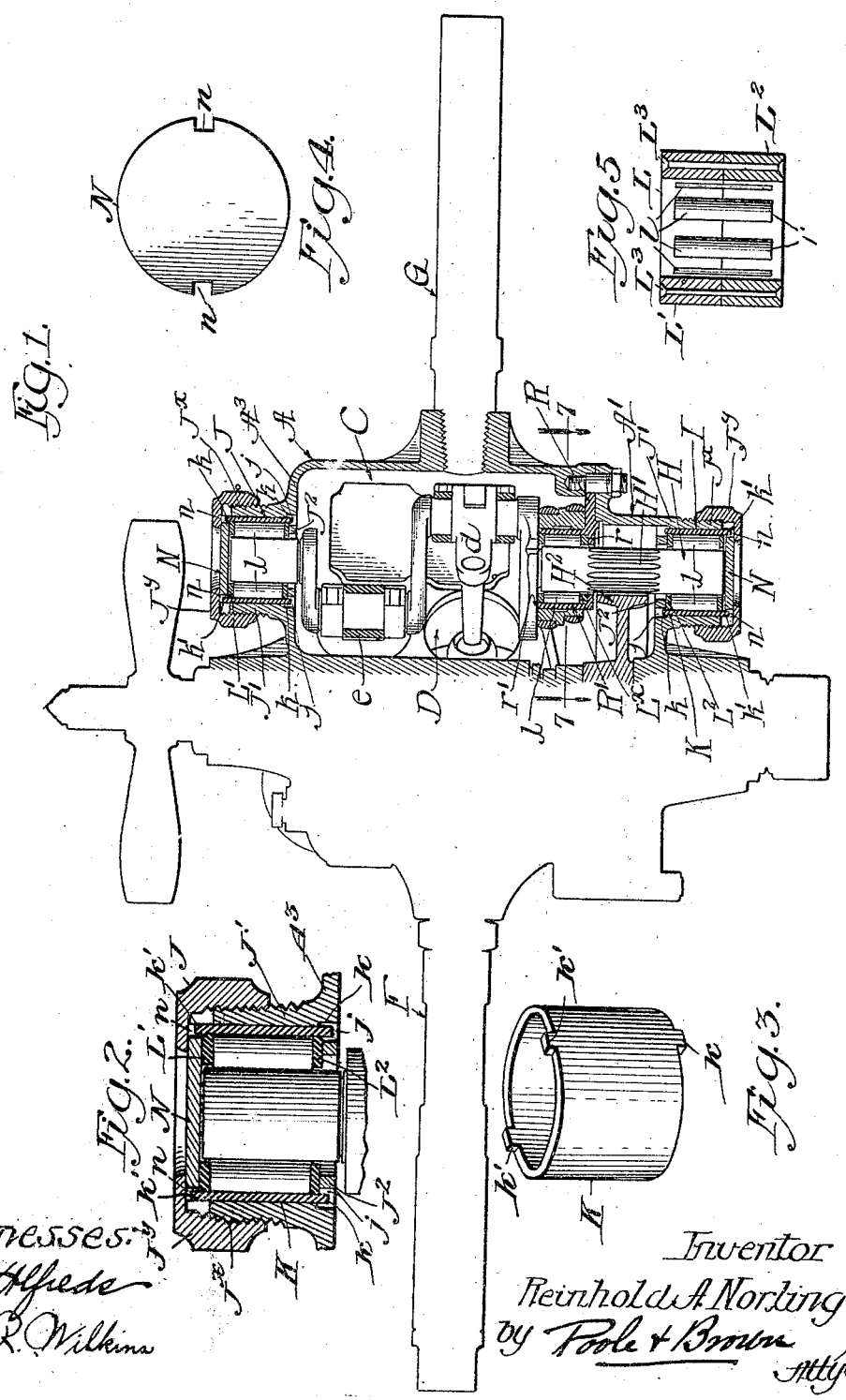

UNITED STATES PATENT OFFICE.

REINHOLD A. NORLING, OF AURORA, ILLINOIS, ASSIGNOR TO AURORA AUTOMATIC MACHINERY COMPANY, OF AURORA, ILLINOIS, A CORPORATION OF ILLINOIS.

ROLLER-BEARING.

1,074,643.  Specification of Letters Patent.  Patented Oct. 7, 1913.

Application filed November 30, 1910. Serial No. 594,814.

*To all whom it may concern:*

Be it known that I, REINHOLD A. NORLING, a citizen of the United States, and a resident of Aurora, in the county of Kane and State of Illinois, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to improvements in portable pneumatic motors and more particularly to such as are applied to operate a drill or like tool.

The improvements constituting my invention appear in the accompanying drawings as applied to a machine having four power cylinders of the kind illustrated in U. S. Letters Patent No. 792,281, granted to me on June 13th, 1905; but my invention is also applicable to other machines of the same general character.

The invention consists of the matters hereinafter described and more particularly pointed out in the appended claim.

In the drawings:—Figure 1 is a partial sectional view of a machine containing my invention, the section being taken through the central axis of the two actuating or driving spindles and the crank shaft of the motor. Fig. 2 is a section taken on the same plane as that of Fig. 1 through one of the end bearings of the crank shaft, the section being on an enlarged scale. Fig. 3 is a perspective view of a bearing sleeve contained in the end bearing. Fig. 4 is a plan view of an end thrust plate provided in the end bearings. Fig. 5 is a vertical section through the cage of the bearings.

The main features of the machine are substantially identical with the machine described in the patent referred to.

A indicates the main casing of the machine which contains the air supply chamber, the power cylinders, and the crank chamber.

C indicates the crank chamber and D (Fig. 1) indicates one of the power cylinders.

The main casing A is provided on one side with a handle G and on the opposite side with a supply pipe F which constitutes the other handle.

H indicates a crank shaft which extends through the crank chamber C and $d$, $e$, Fig. 1, indicate connecting rods which are connected respectively to a piston working in the cylinder D and to a piston working in one of the other cylinders, which does not appear in the drawings. Said crank shaft engages at its upper end a bearing J supported in the top wall of the casing A at the top of the crank chamber and at its lower end engages a bearing I, which is supported in a cap or auxiliary casing $A^1$, which is secured to what may be called the lower face of the main casing A. The main driving spindle (not shown) is actuated by the crank shaft H through a pinion $H^1$ formed on said crank shaft and intermeshing with a spur gear $H^2$ keyed to said spindle.

The features of the machine thus far referred to are substantially as described in the above mentioned patent and require no further description.

I now pass to a description of the features of my particular invention referred to herein which relate to the bearings of the crank shaft H. The bearings I and J are identical and a description of one will suffice for both.

$J^1$ indicates a tubular housing made rigid with the casing, in this case, the top wall $A^3$ of said casing. The said housing is interiorly cylindric and forms a chamber into which the end of the shaft extends. As shown in the drawings, said housing embraces a threaded part $J^x$ made integral with the casing top $A^3$ and an internally threaded cap $J^y$ screwed thereon. At the base of said housing is formed an annular internal flange $J^2$ which surrounds but is spaced from the crank-shaft and forms an outwardly facing, annular shoulder at the inner part of the cylindrical chamber formed by the part $J^x$. Said flange is provided with diametrically opposite apertures $j$, $j$.

K indicates a bearing-sleeve which is located within the housing $J^1$ with its inner end bearing against an outwardly facing shoulder on the flange $J^2$, and lugs $k$, $k$ formed thereon engaged within the apertures $j$, $j$ (see Figs. 2 and 3). Within the bearing sleeve K is located a cage L in which are rotatably mounted antifriction rollers $l$. Said cage L is divided by a transverse plane at right angles to its longitudinal central axis into parts $L^1$ $L^2$ which are rigidly secured together by means of longitudinally extending rivets $L^3$ $L^3$. Longitudinal, similarly spaced, apertures $l^1$ are formed in the cage. The rollers $l$ have bearing in said apertures and engage with their inner surfaces against the crank-shaft H. The cage L and bearing-sleeve K are confined in place by a plate N which engages against the outer end of the bearing sleeve K and is rigidly held engaged therewith by the cap $J^y$. Said plate N is provided with notches $n$ $n$, into which project lugs $k^1$ $k^1$ formed on the outer end of the bearing sleeve K. By reason of the engagement of the lugs $k$ $k$ of the bearing-sleeve K in the apertures $j$ $j$ of the annular housing flange $J^2$, said sleeve is held against rotation and on account of the engagement of the lugs $k^1$ $k^1$ of the sleeve in the notches $n$ $n$ of the plate N, said plate is held against rotation. The cage L fits loosely between the bearing-sleeve K and the crank-shaft H and has sufficient end play between the plate N and the housing flange $J^2$ to run freely.

As in the patent above referred to the crank-shaft is supported intermediate its ends by a bearing-plate R which is clamped at its margins between the parts A and $A^1$ of the casing and which has a bearing sleeve $R^1$ as in the patent referred to. Said bearing sleeve $R^1$ is in this instance provided at one end with an annular flange $r$ spaced from the crank-shaft. The opposite end of said sleeve $R^1$ abuts against an annular shoulder $r^1$ formed on the crank-shaft H and between the shoulder $r^1$ and the flange $r$ is located a cage $L^x$ provided with rollers $l$ as before. Said cage fits loosely between the bearing-sleeve $R^1$ and the crank-shaft H and is confined in place by the shoulder $r^1$ on the shaft and the flange $r$ on the sleeve.

I claim as my invention:—

The combination with a casing and a shaft, of an end bearing for said shaft, comprising a cylindric housing provided with a bore concentric with said shaft, and an annular flange at the inner end of said bore, said flange being provided with transversely extending apertures, a bearing sleeve fitting within said bore and provided at its ends with outwardly extending lugs, the lugs at the inner end thereof being adapted to engage the apertures of the said flange, to prevent the rotation of the said sleeve, a cage containing a plurality of antifriction rollers, interposed between the shaft and said sleeve, a circular thrust plate extending over the end face of the shaft and bearing against the end surface of the bearing sleeve, said plate being provided at its margin with notches adapted to be engaged by the said lugs on the outer end of said sleeve, to prevent the rotation of said plate relative to the said sleeve, and a cap having screw-threaded engagement with the outer marginal surface of said housing and adapted to bear against the outer surface of said thrust plate.

In testimony, that I claim the foregoing as my invention I affix my signature in the presence of two witnesses, this 26th day of November, A. D. 1910.

REINHOLD A. NORLING.

Witnesses:
 ALOIS C. WARKEN,
 CHAS. A. BURGESS.